United States Patent [19]
Perfetti

[11] Patent Number: 4,517,325
[45] Date of Patent: May 14, 1985

[54] CORROSION RESISTANT CORE-PLATE AND COATINGS THEREFOR

[75] Inventor: Bruno M. Perfetti, Jeannette, Pa.

[73] Assignee: United States Steel Corporation, Pittsburgh, Pa.

[21] Appl. No.: 541,613

[22] Filed: Oct. 13, 1983

[51] Int. Cl.³ .............................................. C08K 3/10
[52] U.S. Cl. ...................... 524/188; 524/86; 524/407
[58] Field of Search ........................ 524/188, 407, 86

[56] References Cited

U.S. PATENT DOCUMENTS

| | | | |
|---|---|---|---|
| 3,491,011 | 1/1970 | Le Bras et al. | 524/407 |
| 3,839,256 | 10/1974 | Parkinson | 524/188 |
| 3,908,066 | 9/1975 | Parkinson | 428/379 |
| 3,954,482 | 5/1976 | Novack | 524/407 |
| 3,979,351 | 9/1976 | Sekhon | 524/407 |
| 4,103,049 | 7/1978 | Nishida et al. | 524/407 |
| 4,108,811 | 8/1978 | Eckhoff | 524/407 |
| 4,411,950 | 10/1983 | Smith | 524/407 |

*Primary Examiner*—Joseph L. Schofer
*Assistant Examiner*—T. M. Reddick
*Attorney, Agent, or Firm*—William L. Krayer

[57] ABSTRACT

An improved coating for electrical or magnetic steel core-plates, having corrosion resistance comprises adding to a known combination of organic quaternary ammonium silicate and ethylene/acrylic or ethylene/vinyl acetate copolymer a small amount of a barium, strontium or lead chromate.

4 Claims, No Drawings

CORROSION RESISTANT CORE-PLATE AND COATINGS THEREFOR

BACKGROUND OF THE INVENTION

This invention is an improvement on the inventions disclosed and claimed in Parkinson U.S. Pat. Nos. 3,839,256 and 3,908,066 entitled "Silicate-Resin Coating Composition" and "Protecting Metal and Metal Products", respectively. The Parkinson patents describe compositions, methods and coated electrical or magnetic grade steel for use in magnetic cores of transformers, motors and the like. The coatings described in the Parkinson patents have been used widely and successfully in commerce. However, there is still a problem evident from time to time with corrosion of the coated steel plate, particularly during storage and/or in use involving continuous viscissitudes of temperature and humidity. While a small amount of corrosion does not significantly affect the performance of the product in motors, generators and transformers, it hampers the salability of the product and generally raises questions of confidence by purchasers and users. When the surface is corroded, also, there is a tendency for the silicate-resin composition to separate from the plate.

The Parkinson patents disclose and claim the use of a class of quaternary ammonium silicates in combination with certain ethylene copolymers, terpolymers and comonomers, applied in an aqueous dispersion, to provide heat-resistant electrical insulation and lubricity. The complete specifications of U.S. Pat. Nos. 3,839,256 and 3,908,066 are incorporated herein by reference. The products they disclose have been successful in all respects including adhesion, toughness, lack of abrasiveness and relative thinness of coating; however, corrosion resistance has been difficult to impart to the substrate at the same time, along with the other desirable attributes.

SUMMARY OF THE INVENTION

My invention comprises the use of a chromate selected from the group consisting of strontium chromate, barium chromate and lead chromate in amounts from as little as 0.1% to 5.0% or more, together with the coating compositions described in the Parkinson patents, applied to the metal substrate in the same manner. Preferably, my new composition includes from about 2% to about 5% by weight of strontium, barium or lead chromate based on the two components (hereinafter sometimes referred to as a "Parkinson formulation") of claim 1 of U.S. Pat. No. 3,839,256, as follows:

A solution or dispersion in an aqueous medium of
a. quaternary ammonium silicate of the formula $WM_2O \cdot X(N_nR_p)_2O \cdot Y\ SiO_2 Z\ H_2O$ where W is a number from 0 to 1, X is a number from 0.33 to 1.5, Y is a number from 2 to 10, Z is a number from 1 to 20, M is an alkali metal, R is an organic radical that forms an NR base selected from alkyl, alkanol, and heterocyclic groups, each independently selected, having from 1 to 20 carbon atoms, n is an integer from 1 to 10, and p is at least 4, and
b. ethylene polymer selected from the group consisting of copolymers, terpolymers and ionomers of ethylene with acrylic, methacrylic or crotonic acids or esters thereof or vinyl acetate, wherein the portion of ethylene polymer derived from ethylene is from about 60 to about 90 weight percent, the weight ratio of $SiO_2$ derived from the quaternary ammonium silicate to ethylene polymer being from about 20:1 to about 1:20, and
c. about 0.1% to about 5%, based on the total of a and b, of a chromate selected from the group consisting of barium chromate, strontium chromate, and lead chromate.

A preferred formulation employs methyl triethanol ammonium silicate having a molar ratio of about $12.5 SiO_2$ to the organic cation and a non-volatile silica weight of about 45 percent.

Preferred ethylene polymers contain about 70–85% ethylene and are used in solutions or dispersions of about 15–30% solids in ammonia.

A preferred ratio of ethylene polymer to silica solids ranges from about 0.3 to about 0.7.

Previous research records indicated that chromate salts could not be used to impart corrosion inhibition to coreplate coatings because they caused the coreplate solutions or dispersions to quickly form rubbery, irreversible gels. These indications were investigated as follows:

100 grams of a Parkinson formulation containing the specific ingredients listed in Table I was mixed with 5 grams of each of the various chromate salts listed in Table II wetted with 1.5 gram of water to aid in thoroughly dispersing the chromate in the silicate-resin medium. The mixtures were set aside to observe the consequences of the combination of coating and chromate. The observations are also recorded in Table II.

TABLE I

|  | Parts by Weight |
|---|---|
| Quaternary Ammonium Silicate Solution, Quram 220 (PQ Corporation) | 200 |
| Soluble Sodium Silicate Solution, PQ Corporation Solution N | 45 |
| Ethylene-Vinylacetate Copolymer Dispersion, Latiseal A7922, (Pierce and Stevens Company) | 53 |
| Ethylene-Acrylic Acid Solution Adcote 37-F-1, (Morton Chemical Company) | 95 |
| Monoethanolamine, Technical Grade | 5 |
| Tamol 731-25, (Rohm & Haas Company) | 0.25 |
| Triton X-114, (Rohm & Haas Company) | 0.25 |
| Surfynol 104, (Air Products) | 0.25 |
| Lard Oil (Grade No. 1), (Mayco Oil and Chemical Co.) | 5 |
| Mineral Oil (Gulf Security 155 or 71) | 7.5 |
| Kaolin Clay, ASP 100 (Engelhart Mineral and Chemicals Company) | 100 |

The ingredients recited in Table I are specifically described as follows:

Quram 220: Methyl triethanol ammonium silicate solution, 45% $SiO_2$ non-volatile content.

Soluble Sodium Silicate Solution N: 37.6% non-volatile solids, $3.22 SiO_2/Na_2O$ ratio.

Ethylene-Vinylacetate Copolymer Dispersion, Latiseal A7922 is a dispersion of approximately 45% copolymer solids in water, a dispersion of a proprietary polymer estimated to comprise about 20–30% vinylacetate and the balance ethylene.

Ethylene-Acrylic Acid Solution, Adcote 37-F-1: 22% non-volatile solids in ammonia, approximately 20% acrylic acid content in copolymer, designated as copolymer EAA 9300 by its manufacturer (Morton Chemical Company).

Tamol 731-25 (Rohm & Haas), Triton X-114 (Rohm & Haas), and Surfynol 104 (Air Products) are all surfactants.

The formulated composition described in Table I is about 48% non-volatile solids and has a specific gravity of 1.30 and a weight per gallon of 10.8 pounds/gal.

TABLE II

| Chromate Reagent | Approximate Time to Form a Rubbery or Hard Gel |
| --- | --- |
| Chromic Acid, $Cr_2O_3$ | 5 minutes |
| Ammonium Dichromate, $(NH_4)_2Cr_2O_7$ | 45 minutes |
| Sodium Dichromate, $Na_2Cr_2O_7$ | 5 minutes |
| Strontium Chromate, $SrCrO_4$ | greater than 60 days |
| Zinc Chromate, $ZnCrO_4$ | 5 minutes |
| Zinc Tetroxychromate, $ZnCrO_4 \cdot 4Zn(OH)_2$ | 5 minutes |
| Potassium Chromate, $K_2CrO_4$ | 5 minutes |
| Barium Chromate, $BaCrO_4$ | 2 weeks* |
| Lead Chromate, $PbCrO_4$ | greater than 60 days |
| Calcium Chromate, $CaCrO_4$ | 40 minutes |
| Calcium Dichromate, $CaCr_2O_7$ | 10 minutes |
| Magnesium Chromate, $MgCrO_4$ | 5 minutes |

*Sample contains some traces of sodium and calcium salts as impurities which accounts for the reduced stability observed.

On the basis of these observations, strontium chromate and lead chromate are the only two chromates which do not cause the silicate-resin vehicle to coagulate or gel. Because unmodified silicate-resin solutions (dispersions) tend to increase in viscosity with time, especially over a period of 60 to 90 days unless stored in cool surroundings, viscosity build-up cannot be used to judge the effect of strontium or lead chromate on viscosity with time in storage. Increases in viscosity of strontium chromate modified silicate-resin mixtures over long periods of time can be reversed by dilution of the mixture with water or water-ammonia solutions and therefore the coatability of such mixtures remains fully viable. The irreversible coagulates or gels produced by the other chromate reagents cannot be restored to coatability.

Concentration ranges of strontium chromate up to five percent of the silicate-resin composition have been prepared successfully. Higher concentrations provide little discernible improvement in corrosion resistance and impose a substantial economic burden on the composition. Premilling of the $SrCrO_4$ into a paste prior to adding it to the silicate-resin coating system makes it easier to disperse this agent into the remainder of the system to give a coating with good smoothness and optimum levelling characteristics.

Duplicate samples, 4×6 inches, of electrical sheet coated with a silicate-resin coating modified with 3 percent by weight (on total formula) of strontium chromate pigment were placed as cover plates over 3.5-inch diameter petri-dishes filled to within ¼-inch of their rims with water. The samples/petri-dishes were stored at ambient room temperature so that the sheet surfaces above the water would alternately condense or evaporate water as the room temperature fluctuated. The sample sheets were examined once every 24 hours for corrosion occurrence or advancement. In this simple test a standard silicate-resin coating is completely rust stained within 24 hours of exposure (one day). Strontium chromate modified coatings of 0.1 mil and 0.2 mil thickness (dry) showed less than 5 percent rust stain and less than 2 percent rust stain, respectively, over the areas exposed to the ambient humidity provided by this test after 21 days of exposure. The percentage estimates are visual approximation as compared to a completely stained unmodified silicate-resin coated specimen. The rusting observed in the strontium chromate-modified coating films were primarily of the pinpoint variety early in the exposure and these in some instances expanded to areas of up to ¼-inch diameter by the end of the 21-day exposure period. In most cases, however, the original pinpoint rust spots remained 1/16-inch or less in diameter. Overall, the test results clearly show the value of the strontium chromate modification of silicate-resin as a means of prolonging the corrosion resistance of the system.

Dry coatings of my composition should be at least 0.05 mil thick.

I claim:

1. Composition useful for coating substrates comprising a solution or dispersion in an aqueous medium of
   a. quaternary ammonium silicate of the formula $WM_2O \cdot X(N_nR_p)_2O \cdot Y\ SiO_2 Z\ H_2O$ where W is a number from 0 to 1, X is a number from 0.33 to 1.5, Y is a number from 2 to 10, Z is a number from 1 to 20, M is an alkali metal, R is an organic radical that forms an NR base selected from alkyl, alkanol, and heterocyclic groups, each independently selected, having from 1 to 20 carbon atoms, n is an integer from 1 to 10, and p is at least 4, and
   b. ethylene polymer selected from the group consisting of copolymers, terpolymers and ionomers of ethylene with acrylic, methacrylic or crotonic acids or esters thereof or vinyl acetate, wherein the portion of ethylene polymer derived from ethylene is from about 60 to about 90 weight percent, the weight ratio of $SiO_2$ derived from the quaternary ammonium silicate to ethylene polymer being from about 20:1 to about 1:20, and
   c. about 0.1% to about 5%, based on the total of a and b, of a chromate selected from the group consisting of barium chromate, strontium chromate, and lead chromate.

2. Composition of claim 1 wherein the quaternary ammonium silicate solution is a solution of methyl triethanol ammonium silicate.

3. Composition of claim 1 wherein the ethylene polymer contains about 70 to about 85% ethylene.

4. Composition of claim 1 wherein the ratio of $SiO_2$ derived from the quaternary ammonium silicate to ethylene polymer is from about 14:20 to about 6:20.

* * * * *